April 23, 1963 W. T. RENTSCHLER 3,086,436
PHOTOGRAPHIC CAMERA HAVING AUTOMATIC DIAPHRAGM SETTING DEVICE
Filed July 25, 1961 4 Sheets-Sheet 1
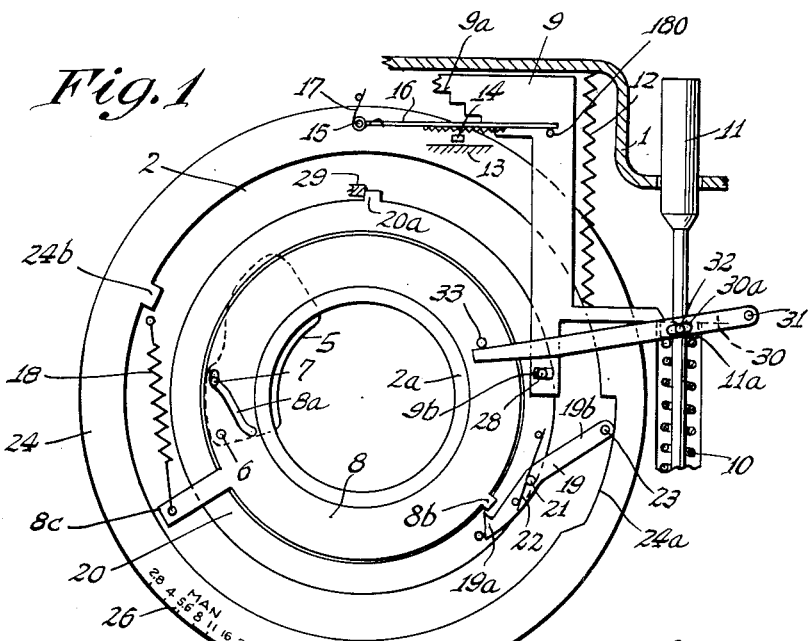
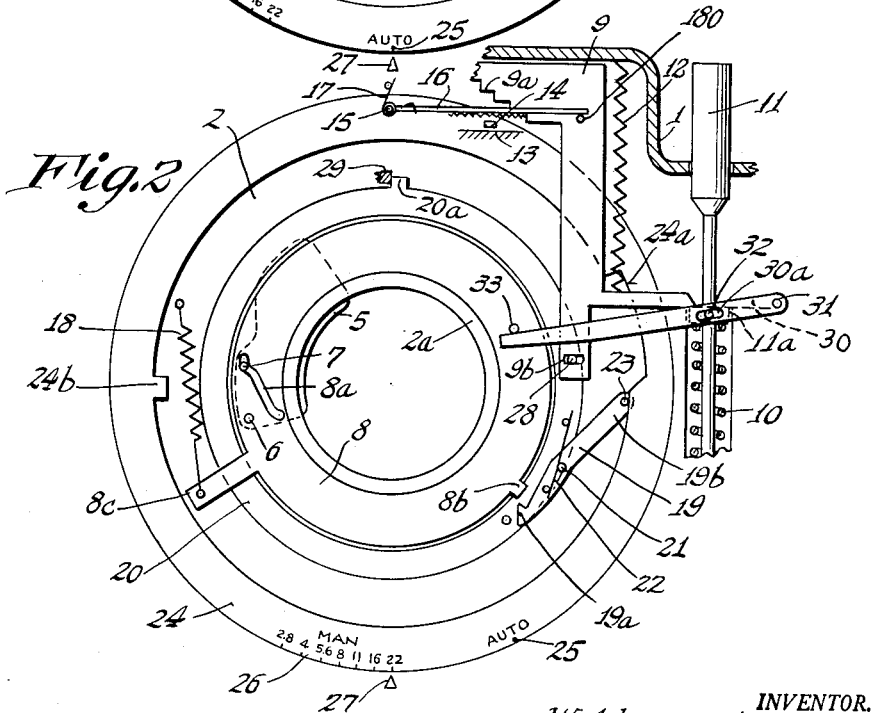
INVENTOR.
Waldemar T. Rentschler
BY
March and Curtiss
ATTORNEYS April 23, 1963 W. T. RENTSCHLER 3,086,436
PHOTOGRAPHIC CAMERA HAVING AUTOMATIC DIAPHRAGM SETTING DEVICE
Filed July 25, 1961 4 Sheets-Sheet 2
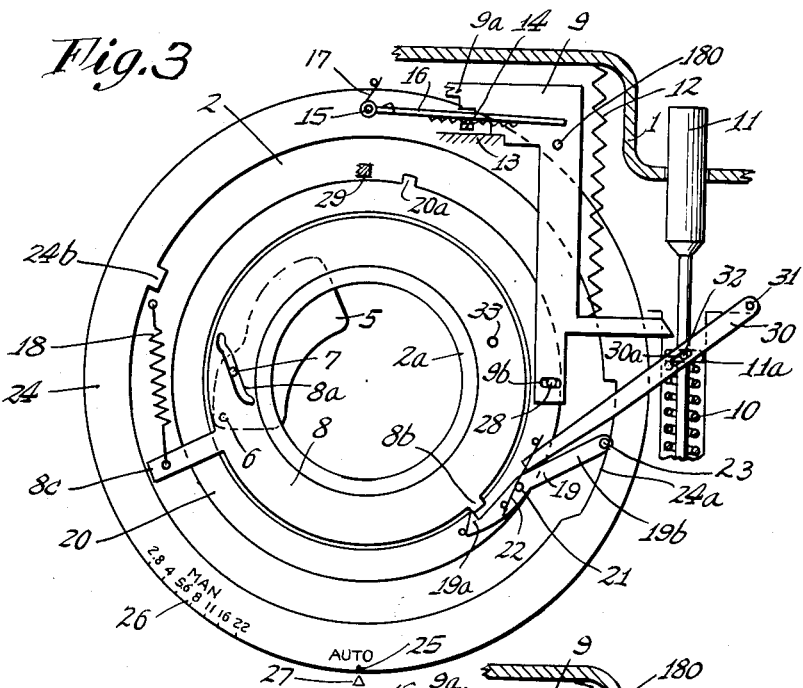
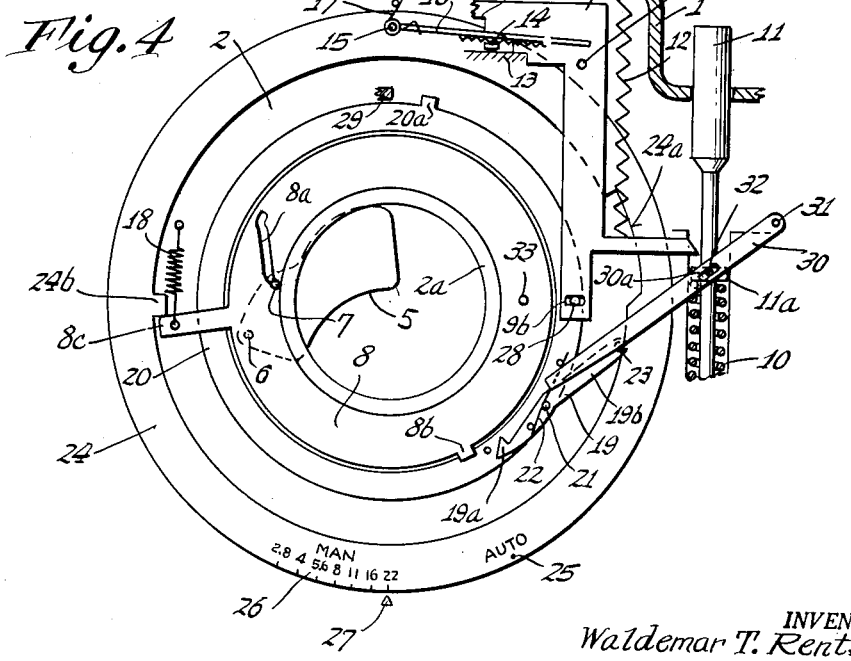
INVENTOR.
Waldemar T. Rentschler
BY
March and Curtiss
ATTORNEYS April 23, 1963 W. T. RENTSCHLER 3,086,436
PHOTOGRAPHIC CAMERA HAVING AUTOMATIC DIAPHRAGM SETTING DEVICE
Filed July 25, 1961 4 Sheets-Sheet 3

INVENTOR.
Waldemar T. Rentschler
BY
March and Curtiss
ATTORNEYS

April 23, 1963   W. T. RENTSCHLER   3,086,436
PHOTOGRAPHIC CAMERA HAVING AUTOMATIC DIAPHRAGM SETTING DEVICE
Filed July 25, 1961   4 Sheets-Sheet 4
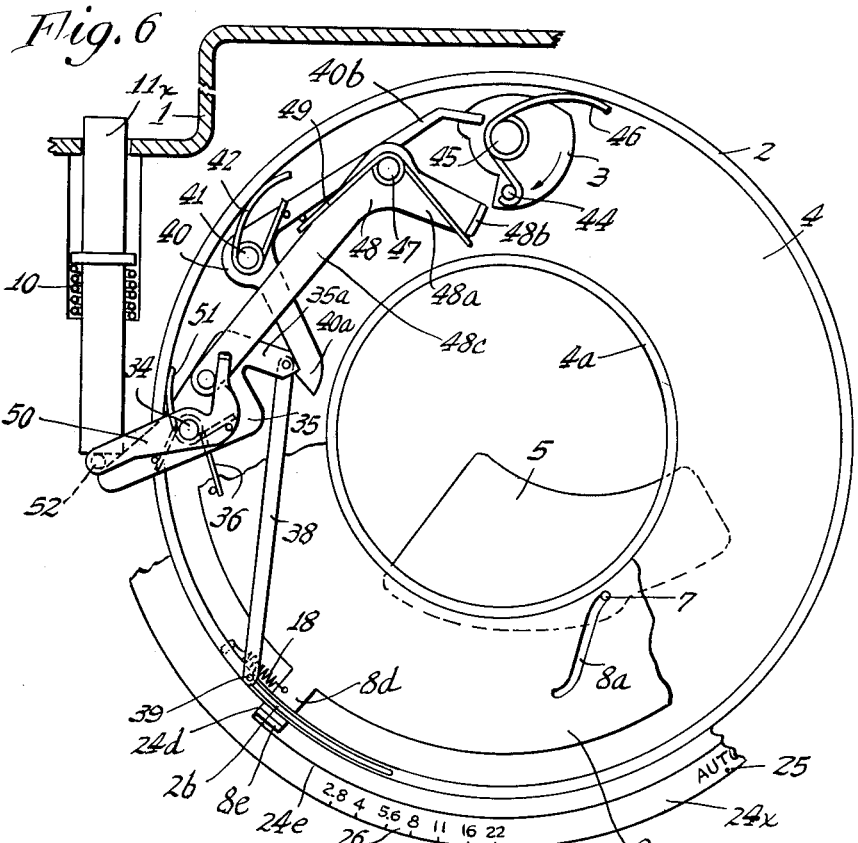
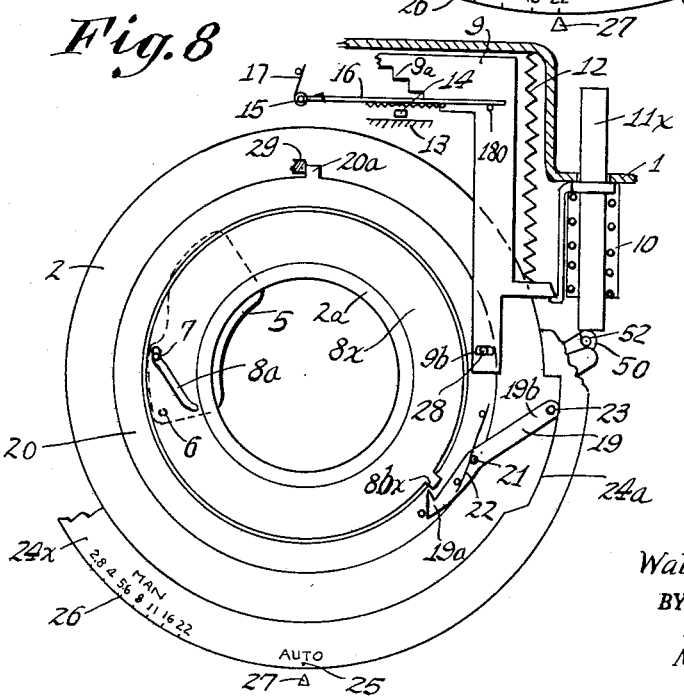
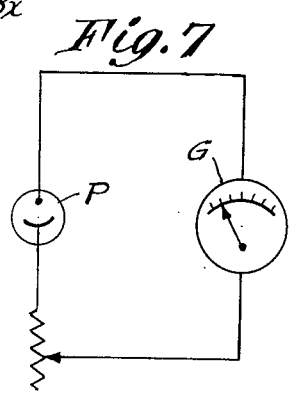
INVENTOR.
Waldemar T. Rentschler
BY
March and Curtiss
ATTORNEYS.

United States Patent Office 3,086,436
Patented Apr. 23, 1963

3,086,436
PHOTOGRAPHIC CAMERA HAVING AUTOMATIC DIAPHRAGM SETTING DEVICE
Waldemar T. Rentschler, Calmbach (Enz), Germany, assignor to Alfred Gauthier, G.m.b.H., Calmbach (Enz), Germany, a corporation of Germany
Filed July 25, 1961, Ser. No. 126,630
Claims priority, application Germany July 26, 1960
6 Claims. (Cl. 95—10)

This invention relates to photographic cameras of the type having automatic diaphragm setting means including a light-intensity measuring device having a movable light-controlled member and a movable sensing member which is cooperable with the light-controlled member to be positioned thereby when the camera release is actuated, there being a diaphragm adjusting member which is actuated by the said sensing member and the camera further having manual control means comprising a manually operable switch or selector member which is settable at "automatic" and "non-automatic" positions and including a manually operable setting means adapted to function when the selector is in the "non-automatic" setting.

Photographic cameras are well known wherein the viewing or sharp focusing of the object to be photographed is effected by utilization of the picture-taking lens, such arrangement for example further including a ground glass focusing screen. It is further well known, in connection with such cameras, to normally retain the diaphragm of the lens assembly at its largest aperture value for the purpose of admitting the greatest amount of light so as to obtain the brightest possible picture in the finder or focusing device.

An object of the present invention is to provide a novel and improved camera of the type outlined above, wherein the setting and retention of the diaphragm at the position required to effect the largest aperture is had in a simple and desirable manner which does not complicate or interfere with the operation of the camera, while at the same time enabling a simple and uncomplicated structure of the diaphragm to be utilized. It is further the object of the invention to provide such a camera wherein the diaphragm is retained at the largest aperture value for both the "automatic" setting and also the "non-automatic" setting of the selector, independently of the respective setting or operating conditions of the light intensity measuring device as well as independently of the cocked or uncocked condition of the camera shutter.

This is accomplished, in accordance with the invention, by a novel organization which includes, in the combination a spring means which biases the diaphragm adjusting member in a direction to effect the smallest diaphragm aperture, and by the provision of means for selectively connecting the diaphragm adjusting member to either the sensing member of the automatic exposure regulator to be automatically regulated thereby, or else to the manually operable setting means so as to be manually regulated, said selective connecting means including stops on the sensing member and also on the manual setting means which are respectively shifted from inoperative to operative positions in response to the selector device being placed respectively in the "automatic" and "non-automatic" positions, such selective connecting means further including additional stops respectively cooperable with said first named stops and disposed on the diaphragm adjusting member. The engagement of the cooperable stops is effected under the action of the spring means which biases the diaphragm adjusting member, and there is further provided a means which is rendered inoperative in response to actuation of the camera release, for shifting the diaphragm adjusting member to, and for normally holding it in a position corresponding to the largest diaphragm aperture after an actuation of said camera release. The shifting of the diaphragm adjusting member to the position effecting the largest aperture is accomplished regardless of the particular prior setting or adjustment of the diaphragm as required by the exposure just completed.

A camera as thus constructed in accordance with the invention has the particular advantage that no special manipulations are required on the part of the operator for moving the diaphragm from its respective setting or adjusted position into the position corresponding to the largest aperture after completion of the exposure. On the contrary, the setting of the diaphragm to effect the largest aperture takes place completely automatically, both for the automatic and also the non-automatic settings of the camera, as well as independently of the indicating or operating condition of the light intensity measuring device and of the camera. This advantageous mode of operation results from the fact that the connections between the diaphragm adjusting member on the one hand and on the other hand the sensing member of the automatic exposure regulator as well as the manually operable setting means comprise tensional or spring-maintained abutment type drives, wherein the sensing member and the manually operable setting means have stops which are engageable with cooperable stops on the diaphragm adjusting member under the action of the same spring means which biases such adjusting member in the direction to effect the smallest diaphragm aperture. The arrangement is such that the stops on the sensing member and manually operable setting means can be shifted so as to be either operative or inoperative in response to setting of the swtich or selector device in either the "automatic" or else the "non-automatic" positions. By such arrangement the setting device which does not participate in the adjustment of the diaphragm is positively separated and disconnected from the diaphragm adjusting member, so that discontinuance of the control influence of the same requires no further precautions or additional act on the part of the operator, and involves no interference with the setting device itself, especially eliminating the necessity of disconnecting the light intensity measuring device. Owing to the above-mentioned tensional or spring maintained separable abutting connection, the diaphragm adjusting member is completely movable against the biasing influence of its spring means, that is, in the direction toward the largest diaphragm aperture, both in the case where the selector device is placed in the "automatic" setting and in the case where it is placed in the "non-automatic" setting. The invention makes use of this freely or completely movable operation of the diaphragm adjusting member in arranging an automatic shifting device, by means of which the diaphragm adjusting member is shifted after completion of an exposure, from its adjusted position into the position corresponding to the largest diaphragm aperture, and retained in such position, the said shifting device being rendered inoperative in response to actuation of the camera or shutter release member.

A functionally dependable, straight-forward and uncomplicated structure for such shifting device is had by the provision of a movable driver member which is engaged by an abutment on the diaphragm adjusting member under the action of the spring-biasing means of the latter, for the non-depressed condition of the camera release, such driver member upon actuation of the camera release being shifted prior to the actual release of the shutter into an inoperative position which is located outside of the path of movement of the said abutment. An especially advantageous and economical construction by which the above objects are accomplished is had by arranging the driver member so that it effects shifting of the diaphragm adjusting member to produce the largest diaphragm aperture in response to the release of the camera release member and under the power or action of the restoring spring for such camera release.

The shifting of the diaphragm adjusting member to effect the largest diaphragm aperture may be accomplished in another manner, by providing for the driver member a separate biasing means which acts oppositely to the spring means of the diaphragm adjusting member and overpowers the same. With such organization a locking device is provided, by means of which the driver member can be retained in its inoperative position corresponding to the depressed condition of the camera release member, such locking device being releasable by a component of the shutter drive mechanism, as for example by the main driving member of such mechanism at the end of the running down movement thereof (at which time the shutter has again been reclosed).

This is of particular advantage with respect to making exposures which involve long exposure times as well as making delayed action exposures, since the restoring of the diaphragm to its full-open position takes place independently of the return movement of the camera release member and only after the camera shutter has again been fully closed after completion of the exposure.

A simple and easy adjustment of the diaphragm restoring device of this last outlined type, which may be effected independently of assembly of the camera, is had when the driver member and the locking device therefor are arranged on a carrier member of the camera shutter, as for example on the shutter base plate, and when the driver member is drivingly connected with the shutter release member.

Further, with such construction there may be effected a saving of space and components by arranging the driver member to be coaxial with respect to the shutter release member whereby these are carried by one and the same pivot post.

Further, the invention provides an easy adaptability of the diaphragm-restoring device as regards the particular structure of the camera and attains a desirable flexibility and freedom of choice concerning the arrangement, by the provision of one or more transmission members which are interposed in the connection between the driver member on the one hand and the camera release member on the other.

In the accompanying drawings, two embodiments of the invention are illustrated. Similar characters of reference are used to designate like components throughout the several views, in which:

FIG. 1 is a diagrammatic elevational view taken from the rear of a photographic intra-lens shutter construction adapted to be mounted at the front of a camera. The said shutter construction includes a segment-type diaphragm having separate lamellas, as well as control devices constructed in accordance with the invention, for effecting automatic and non-automatic setting of the diaphragm, which are arranged to be selectively connected by actuation of a selector device, as by placing the same in "auto" (automatic) and "man" (manual or non-automatic) positions. In such shutter construction there is further provided a restoring device, by means of which the diaphragm-adjusting means is shifted after an exposure has been completed, from its previously adjusted position to an end position corresponding to the largest diaphragm aperture, and is retained in the said position. The said restoring device is made inoperative in response to actuation of the camera release member. The latter is shown in its non-depressed or non-actuated position, whereas the selector device is set at the "auto" position.

FIG. 2 is a view similar to that of FIG. 1, but illustrating the selector device in the "man" position wherein manual adjustment of the diaphragm is effected.

FIG. 3 is a view similar to that of FIG. 1, but showing the camera release member as having been depressed.

FIG. 4 is a view similar to that of FIG. 2, but showing the camera release member in the depressed position.

Figure 5:
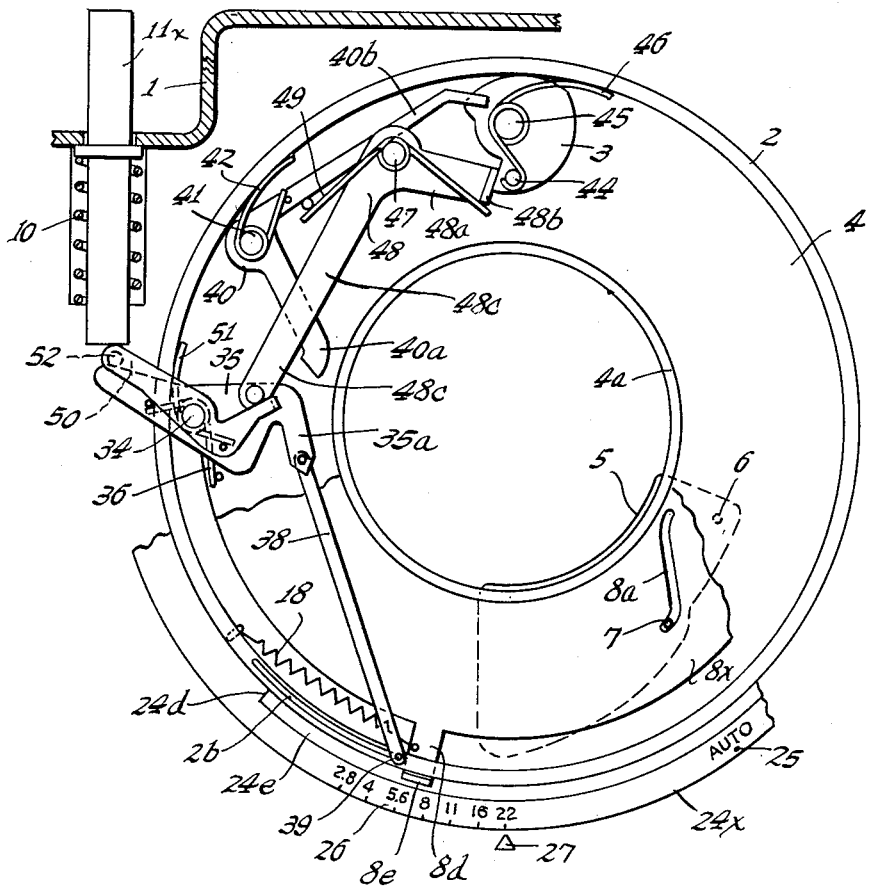

FIG. 5 is a diagrammatic front elevational view of a photographic intra-lens shutter construction as carried at the front of a camera, constituting another embodiment of the invention. The shutter front plate and the exposure time setting ring have been removed in order to show interior details. Arranged in the shutter housing is a device for restoring the diaphragm to its fully opened position, as provided by the invention, such device differing from that illustrated in FIGS. 1–4. The shutter is shown in its cocked position.

FIG. 6 is a view similar to that of FIG. 5, but showing the camera release member in its depressed position, immediately prior to release and opening of the shutter.

FIG. 7 is a schematic circuit diagram illustrating the light sensitive cell and measuring device, comprising the automatic exposure regulator.

FIG. 8 is a diagrammatic rear elevational view of the photographic intra-lens shutter construction shown in FIGS. 5 and 6, illustrating the automatic and manual diaphragm adjusting mechanisms.

Referring first to FIGS. 1–6, the case of the photographic camera is indicated by the numeral 1. On the front side of the case 1 there is carried a photographic intra-lens shutter assemblage comprising a shutter housing 2, in a well known manner. Arranged in the shutter housing 2 is a base plate 4 (FIGS. 5 and 6) having a tubular connection fitting 4a in which lenses of the camera objective are arranged. The base plate 4 positions and carries the well known components of the shutter mechanism, there being particularly illustrated the cocking and driving disk 3 of the shutter drive. A lamella or segment-type diaphragm is located in the rear portion of the shutter housing 2, in the well known manner. The said diaphragm comprises a plurality of sector-like lamellas 5, only one of which is shown herein for reasons of clarity of illustration. The lamellas 5 are carried on fixed pins 6 of the shutter housing 2, and further have pin-and-slot connections 7, 8a with a turnable setting or diaphragm adjusting ring 8 which is located on the rear of the shutter housing 2, bearing on a shoulder or flange 2a thereof. For reasons of clarity of illustration, the diaphragm adjusting ring is shown in fragmentary elevation, in FIGS. 5 and 6.

For the purpose of automatically setting the diaphragm there is provided a sensing member 9 which cooperates with and adjusts the diaphragm adjusting ring 8 whereby the position of the movable coil of an electric exposure meter built into the camera is translated into a corresponding position of the ring 8 and the diaphragm aperture. Such sensing takes place in a well known manner, in response to actuation of the camera release member 11 which moves in a direction at right angles to the axis of the intra-lens shutter assemblage against the action of its return spring 10.

The sensing member 9, which in FIGS 1 to 4 is movable vertically (as seen in these figures), is acted on by a helical compression spring 12, which tends to maintain it in engagement with a collar or flange 11a provided on the release member or camera release 11. The spring 12 is weaker than and adapted to be overcome by the return spring 10 which influences the camera release 11, so that the sensing member 9 normally occupies a raised position as shown in FIGS 1 and 2 when the camera release 11 is in the non-influenced or non-depressed state. For the purpose of cooperating with the turnable coil (not shown) of the galvanometer G illustrated in FIG. 7, the sensing member 9 has a stepped edge or cam 9a which is adapted to engage, upon actuation of the camera release 11, the needle 14 of the galvanometer. Such engagement is under the action of the spring 12, and it will be understood that the needle 14 carried by the turnable coil of the galvanometer and is movable over a fixed supporting surface 13. Prior to execution of the sensing operation, the needle 14 is clamped in its adjusted position, in a well known manner, by means of a clamping device, the said clamping device comprising in the present instance a lever 16 which is pivotally movable about an axis 15 and which, when the sensing member 9 is in the raised or starting position shown in FIGS. 1 and 2, is also held raised by engagement with a pin 18*0* carried on the sensing member. A spring 17 biases the clamping lever 16 in a clockwise direction as viewed in FIGS 1 and 2. For such raised position of the clamping lever 16 the needle 14 can freely shift in response to the energization of the galvanometer G as effected by the photoelectric cell P and circuit shown in FIG. 7. However, when the sensing process begins in response to depressing movement of the camera release 11, the lever 16 at its lower or grooved side engages the deflected needle 14, pressing the same against the supporting surface 13. This is effected prior to the sensing member shifting to such extent that it effects an adjustment of the diaphragm. For this initial clamping action, the small movement of the sensing member 9 and accompanying movement of the diaphragm adjusting ring 8 does not alter the positions of the diaphragm segments 5 for the reason that the control slots 8*a* in the diaphragm adjusting ring 8 have short concentric portions where the slots are occupied by the segment pins 7 with the segments fully opened, this being clearly shown in FIGS. 1 and 2. Obviously where concentric portions of the slots 8*a* exist, no adjustment or movement of the diaphragm segments 5 takes place.

For the purpose of selectively carrying out exposures with either the automatic or else the non-automatic adjustment of the diaphragm, the camera or shutter further has a manual control means which includes a manually operable switch or selector device which is settable at "automatic" or "non-automatic" positions, including a manually operable setting means which functions during the "non-automatic" setting of the selector device. Details of this manual control means will be described below.

In accordance with the present invention, the shifting of the diaphragm to effect the largest aperture value which might be required for a setting process is effected, in the case of both the automatic and non-automatic adjustment, against the action of a biasing spring 18 which is associated with the diaphragm adjusting ring 8 and which biases the said ring in a clockwise direction as viewed in FIGS. 1 and 2, tending to shift the ring so as to effect the smallest diaphragm aperture. In conjunction with such spring the invention provides a means for selectively connecting the diaphragm adjusting member 8 to either the sensing member 9 (through an intermediary ring 20) to be automatically regulated thereby or else to the manually operable setting means comprising the ring 24 so as to be manually regulated. The said means for selectively connecting the diaphragm adjusting member includes stops provided on the sensing member 9, 20 and also on the manual setting means 24, such stops being respectively shifted from inoperative to operative positions in response to the selector device 24 being placed respectively in the "automatic" and "non-automatic" positions. The selective connecting means further includes additional stops respectively cooperable with the said first-named stops and disposed on the diaphragm adjusting member 8, the engagement of said additional stops being effected under the action of the biasing spring 18 and also selectively according to the setting of the selector device 24. The invention further provides a diaphragm restoring means which is rendered inoperative in response to actuation of the camera release, for shifting the diaphragm adjusting ring 8 from any of its adjusted positions to an end position, and for normally holding such ring in said end position wherein the largest diaphragm aperture is had, this occurring after an actuation of the said camera release 11.

The stop which is provided on the sensing member 9 is in the form of a pivotal lever 19, which is pivotally movable about an axis 21 provided on a transmission ring 20 which is to be described below and which is influenced or biased in a clockwise direction by a spring 22. One arm 19*a* of the lever 19 comprises a stop which is adapted for engagement with a projection 8*b* provided on the diaphragm adjusting ring 8, such projection constituting one of the said additional stops (herein also referred to as a counter-stop). The other arm 19*b* of the lever 19 has a pin 23 affixed thereto, which is cooperable with a cam edge 24*a* provided on the switch or selector ring 24. The said ring is positioned on the rear of the shutter housing 2, in the manner shown in FIGS. 1 through 4.

For the purpose of eliminating components, and in order to enable a quick and easily understood setting operation of the camera to be had, the switch or selector ring 24 is also arranged to serve as the manually operable setting means for the diaphragm. For this purpose, there is provided on the selector and setting ring 24 a setting mark 25 identified by the word "auto" as well as a diaphragm scale 26 which is identified by the word "man" (signifying manual or non-automatic). By using such marks and scale the ring 24 is positioned with respect to a fixed index mark 27.

As is apparent from FIGS. 1 to 4, the transmission ring 20 is also positioned on the rear wall of the shutter housing 2, and has a pin-and-slot connection 9*b*, 28 with the sensing member 9. When the camera release 11 is in the non-depressed position shown in FIGS. 1 and 2 the transmission ring 20 is positioned, by engagement between a projection 20*a* provided thereon with a fixed stop 29.

The shifting of the diaphragm adjusting ring 8 in the case where exposures are to be made utilizing the automatic exposure regulator is effected as follows:

With the selector ring 24 placed in the "auto" position as shown in FIGS. 1 and 3, the stop lever 19 occupies the position also shown in the figures, wherein the projection 8*b* of the diaphragm adjusting ring 8 engages under the action of its spring 18 the arm 19*a* of the lever 19. As the sensing operation is carried out, the diaphragm adjusting ring 8 moves in a clockwise direction under the action of the spring 18, from the starting position shown in FIG. 1 into an adjusted position which is determined by the deflected position of the measuring mechanism needle 14, as shown in FIG. 3.

Where the diaphragm is to be adjusted manually, as for the purpose of effecting exposures without utilization of the automatic exposure regulator, the selector and setting ring 24 is shifted to bring the desired diaphragm aperture value on the scale 26 opposite the index mark 27. When this is done, the stop lever 19 is pivoted against the action of its spring 22 by means of the cam edge 24*a* on the ring, whereby the arm 19*a* of the lever 19 is moved out of the path of movement of the projection 8*b* on the diaphragm setting ring. Thus, the stop or abutment connecting 8*b*, 19 is now replaced by another stop or abutment connection involving the diaphragm adjusting ring 8, which also concerns the diaphragm setting ring 24. Such second stop or abutment connection, in the embodiment illustrated in FIGS. 1 to 4, comprises a projection 24*b* provided on the selector and setting ring 24, which is shiftable into the path of movement of an arm 8*c* provided on the diaphragm setting ring 8. The arrangement of the stops or abutments 8*c* and 24*b* is such that, upon the ring 24 being shifted from the automatic position to the manual position or to any diaphragm aperture value at such manual position, the stop lever 19 is rendered inoperative prior to the stops 8*c*, 24*b* becoming engaged.

In accordance with the invention, the diaphragm restoring device which serves to shift the diaphragm setting ring 8 from any of its adjusted positions as required by an exposure (either as effected by deflection of the measuring mechanism needle 14 or else by setting of the ring 24) into the restored position which corresponds to the largest diaphragm aperture comprises a movable driver member, which is arranged to engage the diaphragm adjusting ring 8 at such times that the camera release 11 is not depressed. Such engagement is carried out under the action of the diaphragm biasing spring 18 as well as in response to shifting movement of the driver member. The said driver member, upon the camera release 11 being depressed and prior to the release of the camera shutter, is shifted into an inoperative position wherein it is disposed outside of the path of movement of the portion of the diaphragm adjusting ring which it can otherwise engage.

The said driver member comprises, in the embodiment of the invention illustrated in FIGS. 1 to 4, a lever 30 which is pivotally movable about an axis 31 and which has a pin-and-slot connection 30a, 32 with the camera release 11. At its free end the lever 30 is adapted to engage a stop pin 33 affixed to the diaphragm adjusting ring 8. As seen in FIGS. 1 and 2, the diaphragm adjusting ring 8 is retained in the position thereof which effects the largest diaphragm aperture, by the driver member 30 as the latter engages the stop pin 33 on the ring. The diaphragm biasing spring 18 maintains the said engagement, as will be readily understood. However, the spring 18, being weaker than the return spring 10 of the camera release 11, will not of itself move the driver member 30 out of the position shown in FIGS. 1 and 2. Instead, this can be done only by depressing movement of the camera release.

Thus, when an exposure is to be made, the depressing movement of the camera release 11 will quickly shift the lever 30 in a counterclockwise direction as seen in the figures, whereby the free end of such lever is moved out of the path of movement of the stop pin 33 of the diaphragm adjusting ring 8. Since the adjusting ring 8 is now released by such movement of the lever 30 it carries out, under the action of its spring 18, a clockwise movement which is in the direction for effecting the smallest diaphragm aperture. In the case where the exposure is to be made with benefit of the automatic exposure regulator, the extent of such shifting clockwise movement of the diaphragm adjusting ring 8 is determined as already described, by the position of the stop lever 19 which is connected to the sensing member 9 and which the projection 8b of the adjusting ring impinges. In the case where the diaphragm is to be manually adjusted, on the other hand, the extent of the adjusting movement of the ring 8 which takes place under the action of the biasing spring 18 is determined by the position of the projection 24b which is provided on the selector and setting ring 24.

When the camera release member 11 is let go of after release of the shutter drive mechanism has been effected, the lever 30 returns to its starting position as shown in FIGS. 1 and 2 under the action of the return spring 10 which influences the release member 11. The lever 30 thereby engages, at its free end, the pin 33 of the diaphragm adjusting ring 8 and restores the latter again to its end position which corresponds to the largest diaphragm aperture. A restoring device for the diaphragm as constructed in the above described manner has an especially simple and economical structure while at the same time providing for a functionally dependable operation.

FIGS. 5, 6 and 8 show another embodiment of the invention, comprising a device for restoring the diaphragm to the fully opened position from any adjusted position in which it has been placed during the taking of an exposure.

The particular novel feature of this second embodiment of the invention resides in the provision of a special or separate biasing means which is associated with the driver member or diaphragm restoring member and which acts oppositely to the diaphragm biasing spring, and by the provision of a locking device which is associated with the driver member and which retains the same in its inoperative position corresponding to the depressed state of the camera release member 11a the said locking device being itself releasable by a member of the shutter drive mechanism as for example by the main driving member at the end of the running down movement of the same, after the shutter has been reclosed.

In the device constructed in the above manner, the opening of the diaphragm occurs independently of the act of letting go of or removing the depressing force from the camera release member and instead occurs at the time that the running down movement of the shutter drive mechanism is completed. Such restoring of the diaphragm to its maximum value of aperture thus occurs after reclosing of the shutter. This produces the important advantage that it is possible to carry out delayed action exposures, as well as exposures involving long exposure times, in an operationally simple and dependable manner.

The driver device for the diaphragm adjusting ring 8 comprises, in the embodiment of the invention illustrated in FIGS. 5, 6 and 8 a driver member or lever 35 which is pivotally movable about an axis 34 carried on the shutter base plate 4, such lever being biased in a clockwise direction by a spring 36 and being cooperable with the camera release member 11x in a manner to be described below. A link 38 is pivotally connected to the arm 35a of the lever 35. The link 38 carries on its free or other end a pin 39 which extends rearwardly in the direction of the optical axis through a clearance slot 2b provided in the side wall of the shutter housing 2. The diaphragm and adjusting ring 8x has an arm 8d which is engageable by that portion of the pin 39 which projects from the rear wall 4 of the shutter housing. When the camera release member 11x is in its inoperative position as shown in FIG. 5, the pin 39 occupies under the action of the spring 36, a position wherein it is engaged by the arm 8d of the diaphragm adjusting ring 8x with such ring in a position corresponding to the largest diaphragm aperture.

Depressing movement of the camera release member 11x in FIG. 5 causes a pivoting counterclockwise movement of the lever 35 against the action of its spring 36 as seen in FIG. 6, whereby the pin 39 is shifted to a position outside of the range of movement of the arm 8d of the diaphragm ring 8x. Under the action of the spring 18, the diaphragm adjusting ring 8x follows the movement of the pin 39 and closes the aperture to an extent, until the stop 19 associated with the sensing member 9 engages a stop 8bx on the ring 8x and halts the adjusting movement of the latter (where automatic diaphragm adjustment is to be had) or until a shiftable stop 24d provided on the selector and setting ring 24x engages the arm 8d of the adjusting ring 8x and halts the ring.

Thus, the stop device which becomes operative for effecting a non-automatic or manual setting of the diaphragm differs, in the embodiment of FIGS. 5–8, from that of the embodiment of FIGS. 1–4. In FIGS. 5 and 6 such stop is shown as comprising the end edge 24d of an arcuate recess or slot 24e which is provided on the selector and manually operable diaphragm setting ring 24x. A bent end 8e provided on the arm 8d extends into the said slot, and is engageable with the slot end 24d as seen in FIG. 6.

The cooperable stops 8bx, 19 associated with the diaphragm adjusting ring 8x and with the sensing member 9, which become operative upon the automatic setting of the diaphragm, are not shown in FIGS. 5 and 6 for reasons of clarity of illustration, but may be seen in FIG. 8.

The locking device for retaining the driver and restoring means 35, 38, 39 (for the diaphragm adjusting ring 8x) in its inoperative position which corresponds to the depressed state of the camera release member 11x comprises a two-armed lever 40 which is pivotally movable about an axis 41 mounted on the shutter base plate 4, such lever being biased in a clockwise direction by a spring 42. The lever 40 has an arm 40a which is engageable, in the manner shown in FIG. 6, with an arm 35a of the lever 35 and which retains the latter in its inoperative position associated with the depressed position of the camera release member 11x. The other arm 40b of the lever 40 is located in the path of movement of a pin 44 carried by the cocking and driving disk 3 of the shutter drive mechanism. Upon running down movement of the driving disk 3, which takes place in a clockwise direction as indicated by the arrow in FIG. 6, the pin 44 ultimately engages the arm 40b of the lever 40, this occurring after the shutter blades have been reclosed. This pivots the lever 40 against the action of the spring 42 in a counter-clockwise direction, whereby the arm 40a of the lever releases the driver lever 35. The lever 35 thereupon returns, under the action of the spring 36, to the starting position shown in FIG. 5 whereby the diaphragm adjusting ring 8x is restored by means of the pin 39, to the end position corresponding to the largest diaphragm aperture.

The cocking and driving disk 3 is positioned about a pivot pin 45 carried by the shutter base plate 4, and is influenced by a driving spring 46. An arresting lever 48 is pivotally carried by a pin 47 mounted on the shutter base plate 4 and serves to retain the driving disk 3 in the cocked position shown in FIG. 5. One arm 48a of the lever 48 has a bent lug 48b adapted to engage a projection 43b provided on the driving disk 3 whereas the other arm 48c of the lever cooperates with a shutter release lever 50 under the action of the biasing spring 49. The lever 50, in order to save extra components, is pivotally mounted about the axis 34 which has been provided for the driver lever 35, and is biased in a clockwise direction by a spring 51. Under the action of such spring, the lever 50 is tensionally (as by an abutting type connection) connected to the camera release member 11.

In order to transmit the releasing movement of the camera release 11x to the lever 35 of the driver device, the releasing lever 50 has a pin 52 which extends parallel to the direction of the optical axis and which engages, upon depressing movement of the release member 11x, the lever 35 so as to shift the same to the position shown in FIG. 6.

The invention has been illustrated and described above in connection with a photographic camera equipped with an intralens shutter assemblage. In addition to this, the invention has utility, and is of importance in connection with cameras of every kind wherein, for the purpose of effecting an automatic diaphragm setting, the position of the movable member of a measuring mechanism of an exposure regulator can be sensed in response to the actuation of the camera release member, such position being transmitted to a diaphragm adjusting member, and wherein such cameras have a manually operable selector which is settable at "automatic" and "non-automatic" positions, as well as a manually operable setting means which is operative at the non-automatic setting of the selector.

For all such cameras, the invention provides the advantage that the opening or restoring of the diaphragm to its largest aperture value which is required for a scanning or focusing operation is effected completely automatically and independently of the respective indicating or operating state of the light intensity measuring device and of the camera, this being true for both the "automatic" setting and for the "non-automatic" setting of the selector device.

The scale and indicia 25, 26 shown in FIGS. 1, 2, 3, 4 and 8 on the rings 24, 24x may be placed on the outer edges or front surface thereof instead of as shown. The present showing on the back surface is for the sake of clarity.

I claim:
1. In a photographic camera of the type provided with an automatic setting means including a light intensity measuring device having a movable light-controlled member and a movable sensing member cooperable with the light-controlled member to be positioned thereby when the camera release is actuated, said camera having a diaphragm adjusting member, having manual control means comprising a selector device settable in "automatic" and "non-automatic" positions and manually operable setting means, in combination, spring means biasing the diaphragm adjusting member in a direction to effect the smallest diaphragm aperture; means for selectively connecting the diaphragm adjusting member either to the sensing member to be automatically regulated thereby or to the manually operable setting means to be manually regulated, said selective connecting means including stops on the sensing member and manual setting means which are respectively shifted from inoperative to operative positions in response to the selector device being placed respectively in the "automatic" and "non-automatic" positions, and including additional stops respectively cooperable with said first-named stops and disposed on the diaphragm adjusting member, engagement of said additional stops being effected under the action of said spring means and selectively according to the setting of the selector device; and means rendered inoperative in response to actuation of the camera release, for shifting the diaphragm adjusting member to and for normally holding it in a position corresponding to the largest diaphragm aperture after an actuation of said camera release, said shifting means including an abutment on the diaphragm adjusting member and a movable driver member adapted to engage said abutment in a unilaterally driving connection therewith under the action of said spring in the non-actuated position of the camera release, said driver member being shifted out of the range of movement of the abutment upon actuation of the camera release and prior to the release of the camera shutter.

2. A camera as in claim 1, wherein there is a restoring spring acting on the camera release, and wherein the said driver member moves the diaphragm adjusting member from its adjusted position to the position corresponding to the largest diaphragm aperture upon return of the camera release from its actuated position by said restoring spring.

3. A camera as in claim 1, wherein there is a spring device connected to the driver member, acting thereon in a manner opposite to the action of said biasing spring and overcoming the latter, wherein there is a locking device for releasably retaining the driver member in its shifted out-of-range position, and wherein there is a shutter drive mechanism having a release member which renders the locking device inoperative at the end of the running-down movement of said mechanism.

4. A camera as in claim 3, wherein there are means including a shutter release member connected to the shutter drive mechanism and actuated by the camera release, for effecting release of the camera shutter, said shutter release member being drivingly connected to said driver member.

5. A camera as in claim 4, wherein the said shutter release member and driver member have a common pivotal axis.

6. A camera as in claim 1, wherein there are transmission means including at least one transmission member, interposed between the said driver member and the camera release.

References Cited in the file of this patent
UNITED STATES PATENTS
2,803,182   Werner _____ Aug. 20, 1957